United States Patent
Kelleher

(10) Patent No.: US 10,514,119 B2
(45) Date of Patent: Dec. 24, 2019

(54) DUCT COUPLING SYSTEM

(71) Applicant: SCHAUENBURG FLEXADUX CORPORATION, Grand Junction, CO (US)

(72) Inventor: John Edward Kelleher, Grand Junction, CO (US)

(73) Assignee: SCHAUENBURG FLEXADUX CORPORATION, Grand Junction, CO (US)

( * ) Notice: Subject to any disclaimer, the term of this patent is extended or adjusted under 35 U.S.C. 154(b) by 460 days.

(21) Appl. No.: 15/359,116

(22) Filed: Nov. 22, 2016

(65) Prior Publication Data
US 2018/0142821 A1  May 24, 2018

(51) Int. Cl.
*F16L 31/00* (2006.01)
*F24F 13/02* (2006.01)

(52) U.S. Cl.
CPC .......... *F16L 31/00* (2013.01); *F24F 13/0209* (2013.01); *F24F 13/0218* (2013.01)

(58) Field of Classification Search
CPC ......... F16L 17/06; F16L 17/03; F16L 17/035; F16L 17/10; F16L 19/0212; F16L 19/0218; F16L 23/10; F16L 23/12; F16L 23/18; F16L 25/06; F16L 25/10; F16L 31/00
USPC .......................... 285/260, 337, 358, 379, 408
See application file for complete search history.

(56) References Cited

U.S. PATENT DOCUMENTS

| | | | | |
|---|---|---|---|---|
| 1,468,297 A | * | 9/1923 | Hogg | F16L 33/04 24/283 |
| 2,804,095 A | | 8/1957 | Schauenburg | |
| 2,911,237 A | * | 11/1959 | Olson | F16L 31/00 285/260 |
| 3,029,095 A | * | 4/1962 | King | F16L 23/10 24/279 |
| 3,441,655 A | * | 4/1969 | Turner | E21F 1/06 174/47 |
| 3,705,736 A | * | 12/1972 | Dawson | F16L 21/002 24/19 |
| 3,874,712 A | | 4/1975 | Watson | |
| 5,157,816 A | * | 10/1992 | Huessler | B64G 1/641 24/279 |

(Continued)

OTHER PUBLICATIONS

Nordfab Duct Claim, 4—40D622 | 3260-0400-10090—Grainger; https://www.grainger.com/product/40D622?gclid=CjwKEAjw1qH ABRDU9qaXs4rtiS0SJADNzJisQlbLAVslEetkaUJy3q_ ADP3YIZs6ZsRbVRaBVueeaBoCOszw_wcB&cm_mmc= PPC:GOOGLEPLAA-_-HVAC%20and%20Refrigeration-_- Ductwork%2C%20Venting%2C%20Fittings%20and%20Caps-_- 40D622&AL!2966!3!57772101357!!!s!109231719717!&s_kwcid= AL!2966!3!57772101357!!!s!109231719717!&ef_id= U3ze4QAAAKwbYq7J:20161020170503:s; website viewed as of Nov. 22, 2016.

(Continued)

*Primary Examiner* — Aaron M Dunwoody
(74) *Attorney, Agent, or Firm* — Holzer Patel Drennan

(57) ABSTRACT

A duct coupling system includes a first duct with a perimeter attached to a compliant sealing gasket and a second duct with a perimeter attached to an annular component sized to interface with a seat of the compliant sealing gasket. The compliant sealing gasket can be selectively tightened around the perimeter of the first duct by engaging a tightening mechanism of a clamp to selectively tension a cable with opposing first and second end portions attached to the clamp and a longitudinal central portion encircling a perimeter of the compliant sealing gasket. Tensioning of the cable causes circumferential compression of the compliant sealing gasket and forms a seal between the first duct and the second duct.

20 Claims, 7 Drawing Sheets

(56) References Cited

U.S. PATENT DOCUMENTS

| | | | | |
|---|---|---|---|---|
| 5,732,982 | A | * | 3/1998 | Gebelius ................ F16L 25/10 285/328 |
| 8,720,955 | B2 | * | 5/2014 | Untch ................ F16L 23/0286 285/260 |
| 2001/0026048 | A1 | | 10/2001 | Proctor et al. |
| 2008/0265570 | A1 | * | 10/2008 | McPheat ................ F16L 25/10 285/235 |
| 2009/0321105 | A1 | | 12/2009 | Sawyer |
| 2013/0026755 | A1 | | 1/2013 | Fernandes et al. |
| 2014/0097611 | A1 | | 4/2014 | Webb et al. |
| 2019/0011067 | A1 | * | 1/2019 | Koch ................ F16L 25/10 |

OTHER PUBLICATIONS

PTFE Flexible Connectors (Teflon) | HTB BVBA; http://www.htb-bvba.eu/siftex/teflon/; website viewed as of Nov. 22, 2016.

\* cited by examiner

DUCT COUPLING SYSTEM

BACKGROUND

Flexible ducts are used to remove and deliver air in applications such as heating, ventilation, and air conditioning. Uses for flexible ducts extend to a variety of fields including construction, mining, and oil field industries. For example, a flexible duct may be used to provide a flow of fresh air to workers in a confined and/or dust-heavy environment. In some applications, flexible ducts are frequently moved from one location to another, entailing labor-intensive disassembly and re-assembly.

SUMMARY

Implementations described herein provide systems and methods for duct coupling. According to one implementation, a duct coupling system includes a compliant sealing gasket arranged in an annular shape to apply an inward force on a perimeter of a first duct. A cable is arranged to encircle the annular shape with first and second opposing end portions attached to a clamp that is engagable to tension the cable and thereby circumferentially compress the compliant sealing gasket radially inward. The duct coupling system further includes an annular component, such as a stiff ring attached to a perimeter of a second duct. The annular component is sized to interface with a seat of the compliant sealing gasket when the tightening mechanism of the clamp is engaged, thereby forming a seal between the first duct and the second duct.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTIONS OF THE DRAWINGS

DETAILED DESCRIPTIONS

Figure 1:
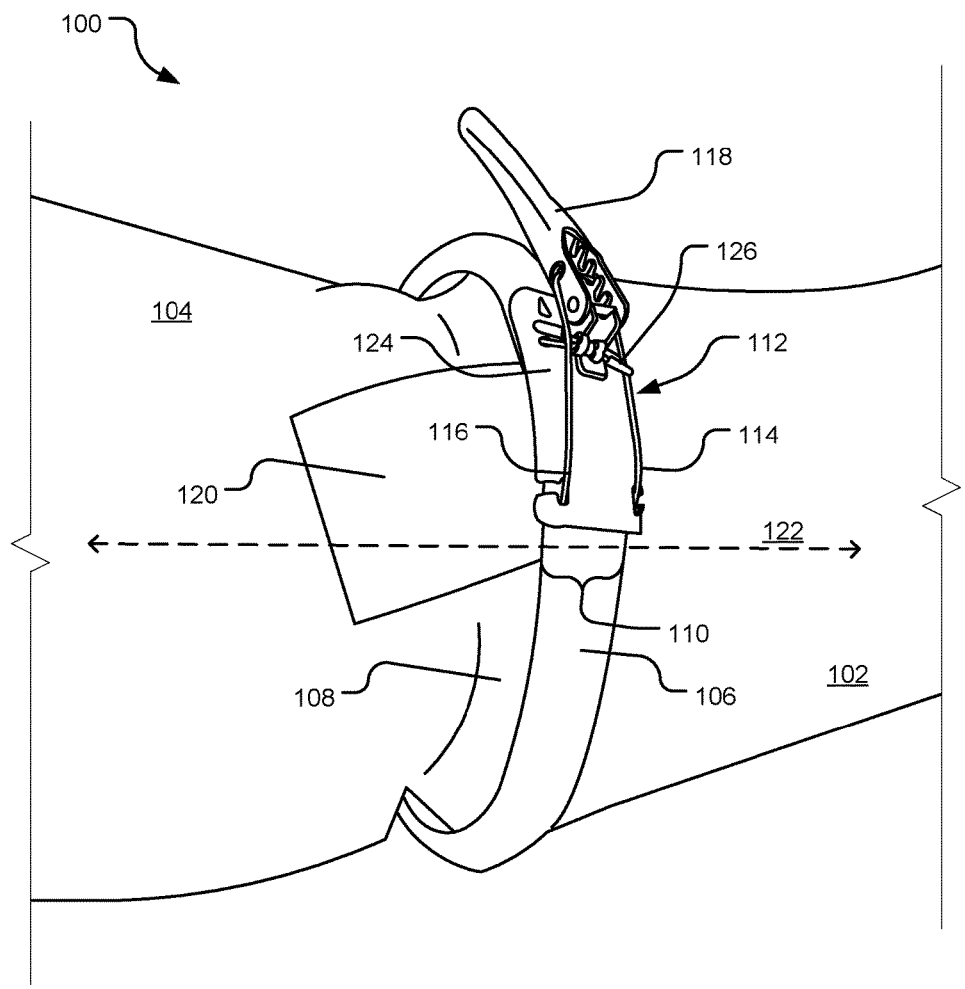
FIG. 1 illustrates an example duct coupling system for creating a seal between a first duct and a second duct.

FIG. 1 illustrates an example duct coupling system 100 for creating a seal between a first duct 102 and a second duct 104. In different implementations, the first duct 102 and the second duct 104 may have varying degrees of flexibility ranging from extremely flexible to semi-rigid. When the duct coupling system 100 is engaged to form a seal (as shown), an end portion 106 of the first duct 102 circumferentially applies an inward force against an end portion 108 of the second duct 104. In one implementation, the end portion 108 of the second duct 104 includes a stiff perimeter component (not shown), such as a rigid or stiff ring that seats to the end portion 106 of the first duct 102 to stabilize a perimeter of the second duct 104 when a seal is created between the first duct 102 and the second duct 104.

The inward force of the end portion 106 is supplied by a compliant sealing gasket (not shown) which is, in FIG. 1, positioned within a fold of a hem 110 of the end portion 106 in the first duct 102. In another implementation, the compliant sealing gasket is not within the fold of a hem 110, but instead attached to an exterior surface of the end portion 106. The compliant sealing gasket assumes an annular shape that encircles a longitudinal axis 122 of the first duct 102. The duct coupling system 100 further includes a clamp 112 usable to circumferentially compress the compliant sealing gasket radially inward. In one implementation, the compliant sealing gasket is a flexible strip of material with first and second ends abridged together via the clamp 112 (e.g., such that the opposing ends are positioned below the clamp 112 and therefore are not visible in FIG. 1).

One or more cables (e.g., cables 114 and 116) extend circumferentially around the first duct 102, such as within a channel of the compliant sealing gasket or adjacent to an exterior-facing surface of the compliant sealing gasket. The cable(s) include opposing end portions that attach to different components of the clamp 112. When tightened, the clamp 112 supplies a tensioning force to the cable(s), and the tightening force in turn pulls the opposing ends of the compliant sealing gasket closer to one another, as shown and described with respect to FIGS. 2-6, below. For example, first end portions of the cable(s) may attach to the tightening mechanism 118 of the clamp 112 (as shown) and opposing second end portions of the cable(s) may fixedly secure to a baseplate 124 of the clamp 114 at a securement point 126.

Figure 4:
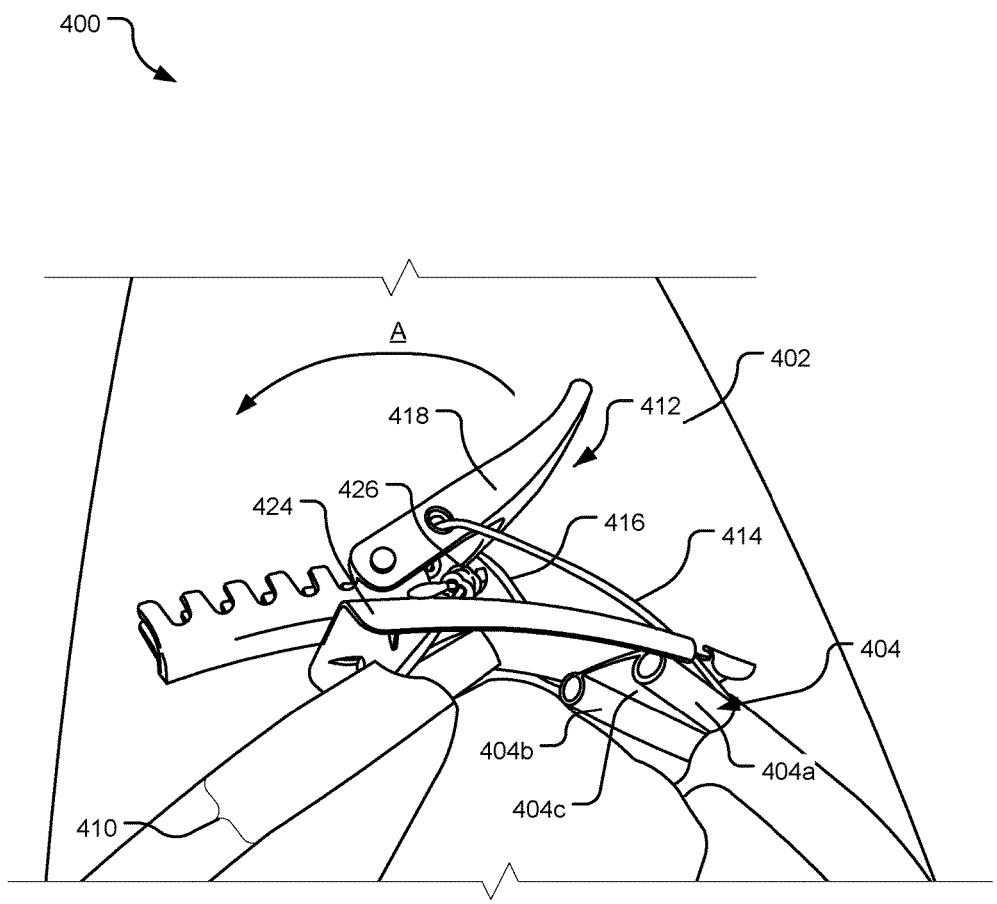
FIG. 4 illustrates components of a duct coupling system including a clamp for forming an airtight seal between a first duct and a second duct.

When the tightening mechanism 118 is placed in an "un-tensioned" position (e.g., as shown in FIG. 4), there exists slack in the cable(s) (e.g., cables 116 and 118) near the baseplate 124 of the clamp 112. When the tightening mechanism 118 is placed into a position of increased tension, as shown in FIG. 1, the cable(s) circumferentially supply a radially-inward force on the compliant sealing gasket, thereby decreasing the annular space encircled by the compliant sealing gasket.

The second duct 104 includes a stiff component (not shown), such as a stiff ring, that seats to the end portion 106 of the first duct 102 and applies a counter-force against the inward force of the compliant sealing gasket, enabling a seal between the first duct 102 and the second duct 104. For example, an end portion of the second duct 104 may include a metal ring sized to interface with annular seat in the compliant sealing gasket. When the tightening mechanism 118 is placed into a tensioned position (as shown), an airtight seal is formed between the first duct 102 and the second duct 104.

In different implementations, the ducts 102 and 104 may be formed from a variety of suitable flexible materials including without limitation various air-impermeable fabrics (e.g., plastic or rubber-coated fabric), thin plastics, metals, etc. In one implementation, the ducts 102 and 104 are made of a fibrous mesh with a rubber and/or plastic coating. One or both of the first duct 102 and the second duct 104 may include an extra flap 120 of material in a region proximal to the clamp 112, so as to provide reinforcement against tears in one or both of the ducts 102 and 104 in areas that may contact portions of the clamp 112.

Figure 2:
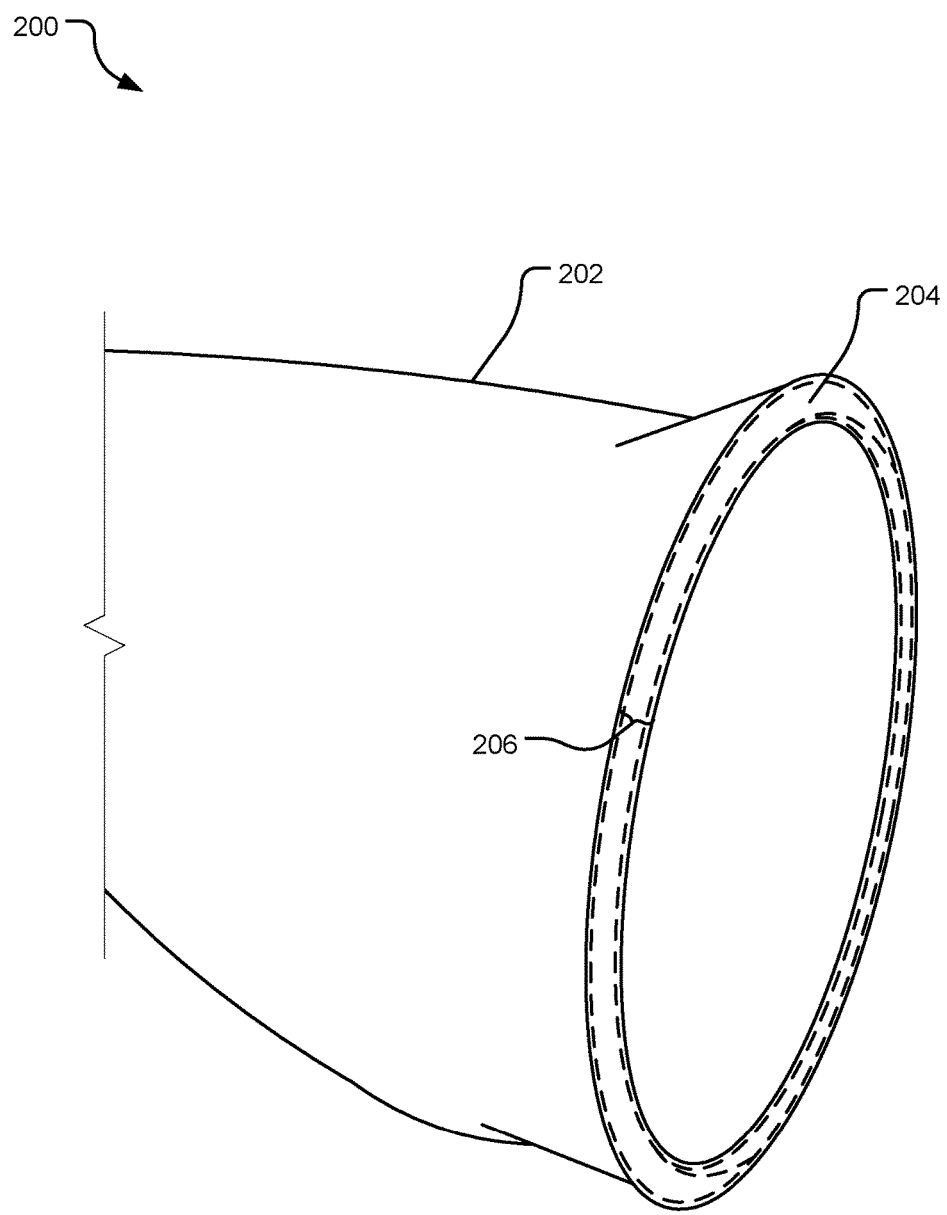
FIG. 2 illustrates a portion of a duct coupling system including an example duct suitable for coupling with another duct.

FIG. 2 illustrates a portion of a duct coupling system 200 including an example duct 202 with an annular component 204 (e.g., a stiff or rigid ring) attached to a perimeter. For example, the annular component 204 may be a solid rigid material or a stiff material such as a woven cable. In operation, an end portion of the duct 202 including the annular component 204 is placed inside an opposing duct, and a compliant sealing gasket is tightened around both ducts to create a seal, which may be airtight, in a region between the annular component 204 and the compliant sealing gasket. The annular component 204 is, in this configuration, resilient enough to resist flexing under the circumferentially-applied force of the compliant sealing gasket.

The rigid annular component 204 is attached to the duct 202 and may, for example, be positioned within a folded hem 206 of the duct 202 (e.g., as shown) or fixedly secured to an outer surface of the duct to encircle an outer perimeter.

Figure 3:
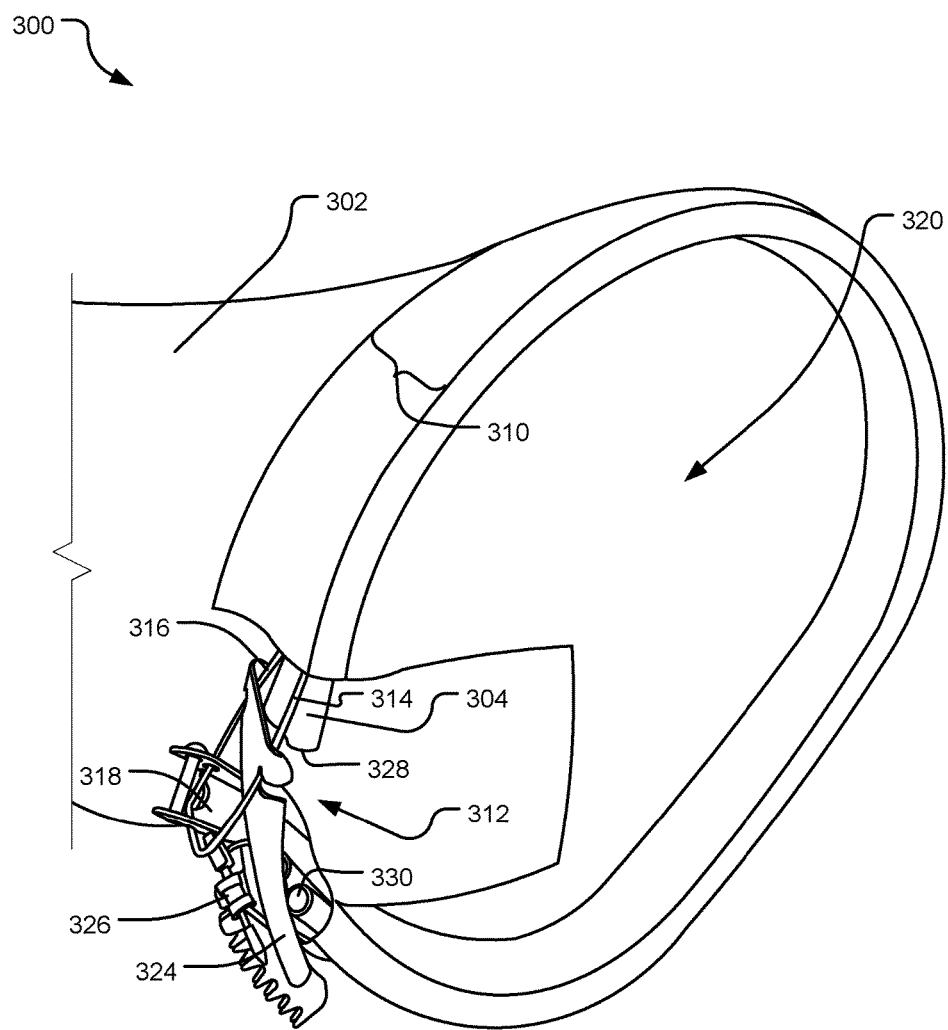
FIG. 3 illustrates a portion of a duct coupling system including another example duct with a compliant sealing gasket for creating an airtight seal with a second duct.

FIG. 3 illustrates a portion of a duct coupling system 300 including another example duct 302 with a compliant sealing gasket 304 for creating an airtight seal with a second duct (not shown, such as duct 202 in FIG. 2). The compliant sealing gasket 304 is arranged in an annular shape and includes two parallel lengths 314 and 316 of cable encircling the annular shape. In one implementation, the two parallel lengths 314 and 316 are housed within one or more channels or cavities formed within the compliant sealing gasket 304. In other implementations, the parallel lengths 314 and 316 of cable are not housed within the compliant sealing gasket 304. For example, one or more cables may instead be positioned to encircle an outer perimeter of the compliant sealing gasket 304 and/or be threaded in and out of holes formed along the length of the compliant sealing gasket 304.

In various implementations, the parallel lengths 314 and 316 of cable may be portions of different cables or of a same cable that is folded back on itself (e.g., as shown in FIG. 3). The term "end portions' is generally used herein to refer to segments of the lengths 314 and 316 of cable that protrude from the compliant sealing gasket 304 and/or the hemmed loop 310. For example, FIG. 3 shows first end portions of the parallel lengths 314 and 316 secured to a tightening mechanism 318 of a clamp 312. Notably, these "end portions" may or may not include a true cable endpoint (e.g., the visible end portions of lengths 314 and 316 are connected to one another and do not include an endpoint). As may be appreciated, ropes, chains, and other flexible elongated tools may be used in lieu of or in addition to the parallel lengths 314 and 316 of cable.

The compliant sealing gasket 304 is, in one implementation, formed by a longitudinal strip of pliable material, such as a flexible rubber, plastic, or bendable soft metal. The clamp 312 is shown abridging opposing ends of the compliant sealing gasket 304. The tightening mechanism 318 (partially shown) of the clamp 312 attaches to the first end portions of the parallel lengths 314 and 316 of cable proximal to a first end 328 of the compliant sealing gasket 304. A base portion 324 of the clamp 312 attaches to second opposing end portions of the parallel lengths 314 and 316 of cable proximal to a second opposing end 330 of the compliant sealing gasket 304 (see e.g., second end portions of the lengths 314 and 316 tied at securement point 326). When the tightening mechanism 318 is placed into the secured (tensioned) position shown in FIG. 3, the first end portions and the second opposing end portions of the lengths 314 and 316 of cable are pulled toward one another. This tension, in turn, circumferentially supplies a radially-inward force on the compliant sealing gasket 304, decreasing the area within an annular space 320 and creating an airtight seal between the first duct 302 and the second duct (not shown).

FIG. 4 illustrates components of a duct coupling system 400 including a clamp 412 for forming an airtight seal between a first duct 402 and a second duct (not shown). The first duct 402 includes a hemmed loop 410 that receives and supports a compliant sealing gasket 404 and two parallel lengths 414 and 416 of cable that extend longitudinally within the hemmed loop 410, encircling an annular space. The compliant sealing gasket 404 includes outer regions 404a and 404b of increased thickness formed on opposite sides of central portion 404c, which has a decreased thickness as compared to the outer regions 404a and 404b. Specifically, the outer regions 404a, 404b each form an elongated channel capable of receiving a corresponding one of the parallel lengths 414 and 416 of cable.

In FIG. 4, first end portions of the parallel lengths 414 and 416 of cable each attach to a tightening mechanism 418 before extending down through entrance locations (e.g., holes punched in an upper surface of the compliant sealing gasket 404) and into a corresponding one of the channels formed by the outer regions 404a and 404b. The parallel lengths 414 and 416 each extend along within the corresponding one of the channels of the outer regions 414a and 404b until reaching corresponding channel exit locations (e.g., additional holes formed in the compliant sealing gasket 404) proximal to a second opposite end of the compliant sealing gasket 404. Upon exiting the compliant sealing gasket 404 at the exit locations proximal to an end of the compliant sealing gasket opposite the entrance locations, the parallel lengths 414 and 416 of cable are threaded through a base portion 424 of the clamp 412 and secured (e.g., tied, fastened, etc.) at a securement point 426.

The tightening mechanism 418 can be placed in a secured position by moving a free end of the tightening mechanism 418 along an arc indicated by an arrow A, thereby pulling the first end portions of the lengths 414 and 416 of cable toward the opposing second end portions. In operation, a stiff or rigid ring of an opposing duct (e.g., the annular component 204 in FIG. 2) may rest adjacent to the central portion 404c of the compliant sealing gasket 404 when the tightening mechanism 418 is tensioned (e.g., in a position such as that shown in FIG. 1). For this reason, the central portion 404c is also referred to herein as the "seat" of the compliant sealing gasket 404.

In some implementations, tensioning the lengths 414 and 416 of cable may cause the compliant sealing gasket 404 to flex laterally such that the outer regions 404a and 404b are pulled radially inward as compared to the central portion 404c (the seat).

Figure 5:
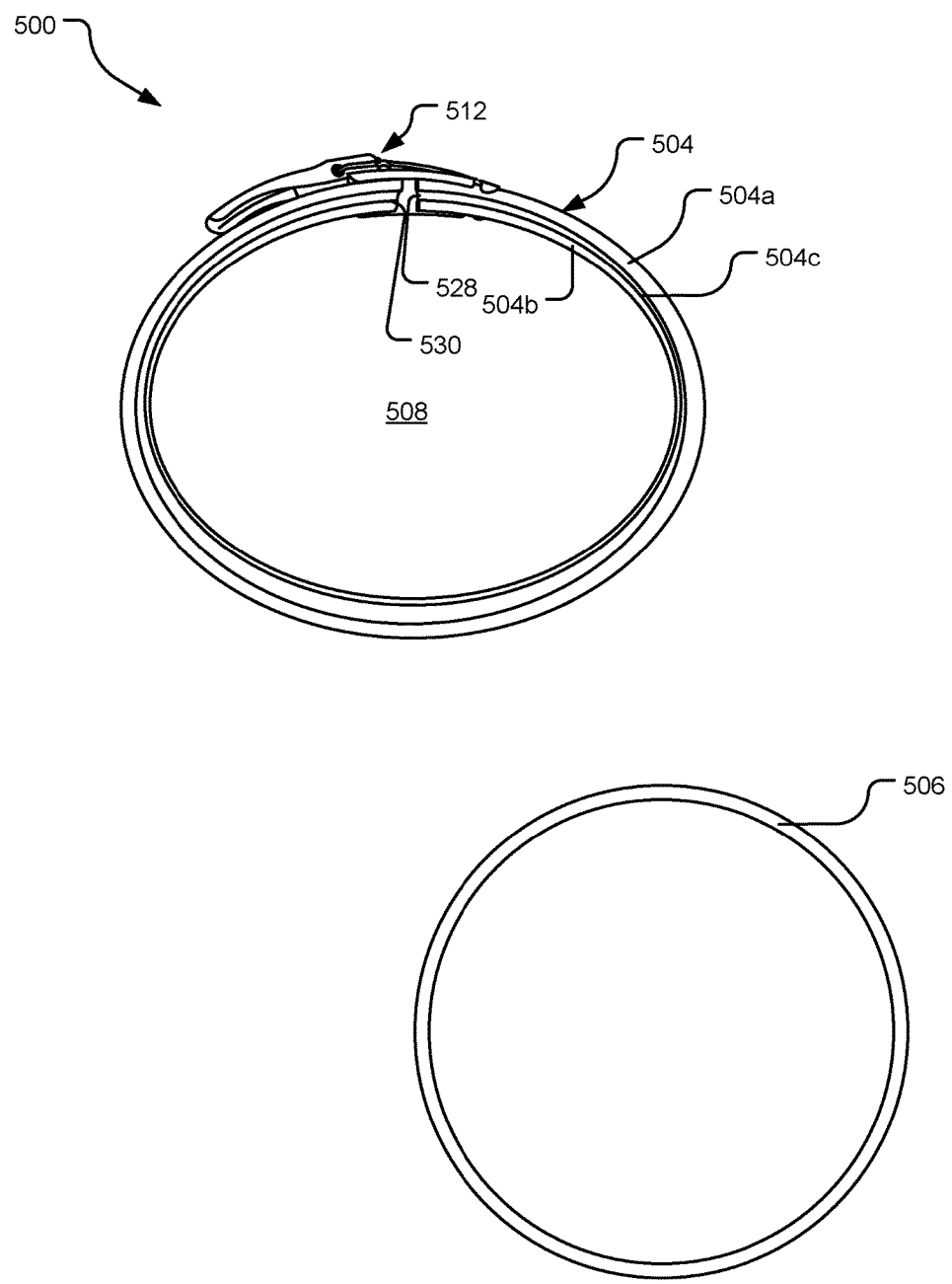
FIG. 5 illustrates example components suitable for integration into a duct coupling system.

FIG. 5 illustrates example components 500 suitable for integration into a duct coupling system. Specifically, FIG. 5 illustrates a compliant sealing gasket 504 with outer regions 504a and 504b of decreased thickness as compared to a central region 504c. The compliant sealing gasket 504 is, in FIG. 5, formed by a longitudinal strip of pliable material, such as a flexible rubber, plastic, or bendable soft metal bent to encompass an annular space 508 (as shown). In another implementation, the compliant sealing gasket 504 is a continuous (unbroken) annular ring.

A clamp 512 is shown abridging opposing ends 528 and 530 of the compliant sealing gasket 504. In one implementation, the clamp 512 does not directly attach to the compliant sealing gasket 504. For example, the clamp 512 may attach to one or more cables that extend within or around the compliant sealing gasket 504 to apply a circumferential inward force on the compliant sealing gasket 504. In another implementation, the duct coupling system creates an airtight seal without use of cables. For example, the clamp 512 attaches directly to opposing ends of the compliant sealing gasket 504 and pulls the ends toward one another when placed in a tensioned position. When the clamp 512 is an un-tensioned position, a diameter of the annular space 508 is larger than when the clamp 512 is in a tensioned position (as shown).

An annular component 506, such as a stiff or rigid metal ring, may be sized for placement within the annular space 508 when the clamp 512 is in an un-tensioned position (e.g., as in the example position shown in FIG. 4). In one implementation, the annular component 506 has a thickness that is slightly less than a thickness of the central region 504c of the compliant sealing gasket 504 so that the annular component 506 may rest within the annular space 508 with its outer perimeter applying a counter-force to an interior perimeter of the compliant sealing gasket 504.

When in use within a duct coupling system, first and second ducts may be positioned between the annular component 506 and the compliant sealing gasket 504 such that a perimeter portion of the ducts are pinched together between the annular component 506 and the central portion 504c when the clamp 512 is in a tensioned positioned.

Figure 6:
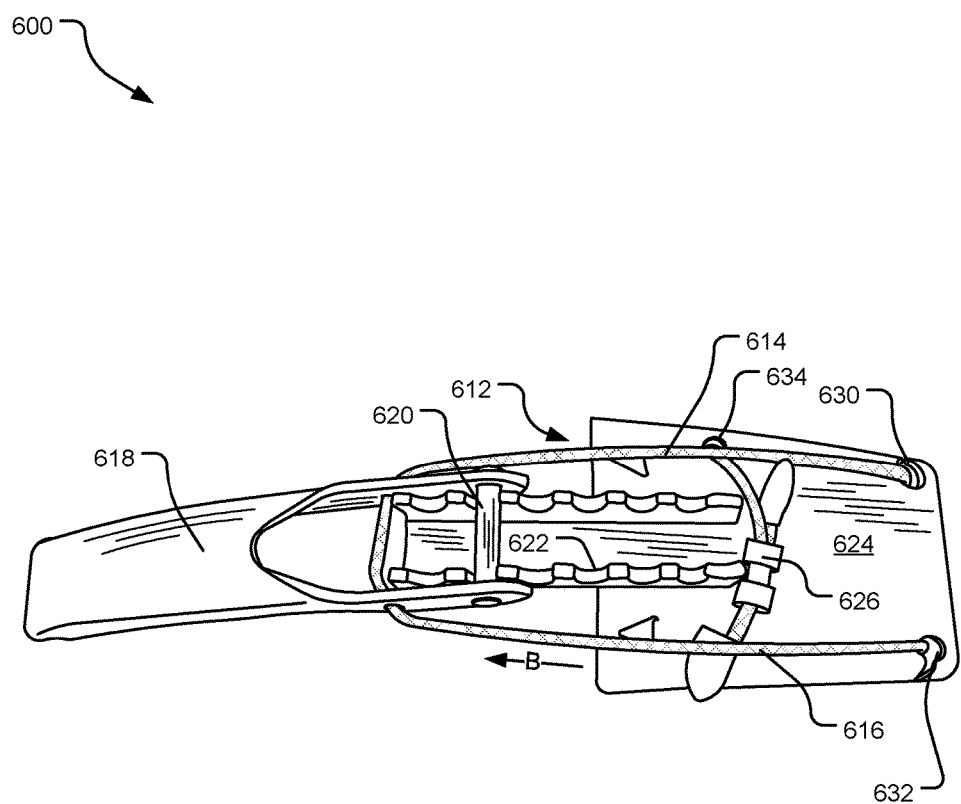
FIG. 6 illustrates another view of example duct coupling system for creating an airtight seal between a first duct and a second duct.

FIG. 6 illustrates further example components suitable for implementation in a duct coupling system 600. Specifically, FIG. 6 illustrates a clamp 612 and various attachment points to corresponding lengths of cable 614 and 616. When assembled in a duct coupling system, other aspects of the system may be the same or similar as those described with respect to other implementations herein.

The clamp 612 includes a leverage arm 618 (e.g., one example tensioning mechanism) that secures to a baseplate 624 when in a tensioned position (as shown). The leverage arm 618 includes a rounded dowel 620 that can be selectively inserted into any of a plurality of grooves (e.g., a groove 622) on the baseplate 624. The leverage arm 618 is attached to first end portions of lengths 614 and 616 of cable that extend through the baseplate 624 at entrance locations 630 and 632. When integrated into a duct coupling system, the lengths of cable 614 and 616 wrap around a compliant sealing gasket (not shown) before threading up through exit locations in the baseplate 624 (e.g., an exit location 634) and fixedly securing to a securement point 626.

When pressure is applied to pivot the leverage arm 618 relative to the baseplate 624, the first end portions of the parallel lengths 614 and 616 of cable are pulled further up through and away from the baseplate 624 in the direction of arrow B, thereby lengthening the exposed cable and effectively applying a circumferential force that decreases a diameter of the annular space encompassed by the compliant sealing gasket.

Figure 7:
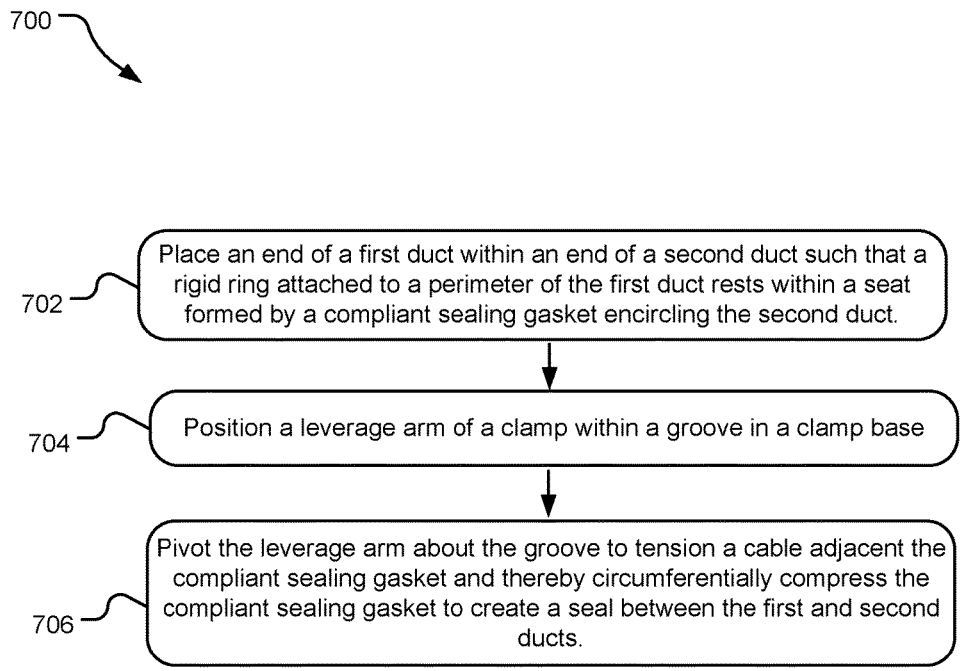
FIG. 7 illustrates example operations for using a duct coupling system.

FIG. 7 illustrates example operations for using a duct coupling system 700. A positioning operation 702 positions an end of a first duct within an end of a second duct such that an annular component attached to a perimeter of the first duct rests within a seat formed by a compliant sealing gasket of the second duct. In one implementation, the compliant sealing gasket is arranged to form an annular shape that encircles and attaches to an outer surface of the second duct. The compliant sealing gasket is further attached to at least one cable arranged to selectively tension the compliant sealing gasket circumferentially (e.g., either the cable threads longitudinally through a housing in the compliant sealing gasket or by rests adjacent to an outer perimeter of the compliant sealing gasket). A longitudinal central portion of the cable extends between first and second end portions of the cable and encircles the compliant sealing gasket. The first end portion of the cable attaches to a leverage arm of a clamp (e.g., one example tensioning mechanism), while the second end portion of the cable fixedly attaches to a baseplate of the leverage arm.

Another positioning operation 704 positions the leverage arm of the clamp within a groove formed in the clamp base. The groove provides a tension pivot that facilitates a tensioning operation 706. During the tensioning operation 706, the leverage arm is pivoted about the tension pivot (e.g., the select groove), thereby tensioning the cable and circumferentially compressing the compliant sealing gasket radially inward toward a center of the annular shape.

The above specification and examples, together with the attached appendix, provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A duct coupling system comprising:
   a compliant sealing gasket forming an inwardly-facing seat, the compliant sealing gasket attached to a perimeter of a first duct and to apply an inward force on a perimeter of a second duct, the compliant sealing gasket arranged in an annular shape;
   at least one cable with a longitudinal central portion adjacent to and encircling the compliant sealing gasket, the cable extending between a first end portion and a second end portion;
   a clamp attached to the first end portion of the cable and to the second end portion of the cable, the clamp including a tightening mechanism engagable to tension the cable and thereby circumferentially compress the compliant sealing gasket radially inward toward a center of the annular shape; and
   an annular component attached to a perimeter of the second duct, the annular component sized to interface with the seat of the compliant sealing gasket when the tightening mechanism of the clamp is engaged, thereby forming a seal between the first duct and the second duct.

2. The duct coupling system of claim 1, wherein a majority of the longitudinal central portion of the cable is housed within the compliant sealing gasket.

3. The duct coupling system of claim 1, wherein the clamp abridges a gap between a first end and a second end of the compliant sealing gasket.

4. The duct coupling system of claim 1, wherein the compliant sealing gasket houses two parallel lengths of cable, each cable resting within an opposing edge region of the compliant sealing gasket that has an increased thickness as compared to a central region of the compliant sealing gasket.

5. The duct coupling system of claim 4, wherein the central region forms the seat of the compliant sealing gasket that receives the annular component when the tightening mechanism of the clamp is engaged.

6. The duct coupling system of claim 1, wherein the clamp includes a base portion that attaches to the first end portion of the cable and wherein the tensioning mechanism of the clamp attaches to the second end portion of the cable.

7. The duct coupling system of claim 6, wherein the tightening mechanism of the clamp pulls the first end portion of the cable toward the second end portion of the cable.

8. The duct coupling system of claim 1, wherein the first and second ducts are formed of a flexible material.

9. The duct coupling system of claim 1, wherein the compliant sealing gasket is positioned within a hemmed loop of the first duct.

10. A method of creating a duct seal comprising:
    placing an end of a second duct within an end of a first duct, the second duct including a perimeter attached to an annular component, the annular component sized to interface with an inwardly-facing seat of a compliant sealing gasket attached to a perimeter of the first duct, wherein the compliant sealing gasket is arranged in an annular shape and a cable is positioned adjacent to and encircling the annular shape between a first end portion and a second end portion; and
    engaging a tightening mechanism of a clamp attached to the first end portion of the cable and to the second end portion of the cable to tension the cable around the compliant sealing gasket, thereby circumferentially compressing the compliant sealing gasket radially inward toward a center of the annular shape and forming a seal between the first duct and the second duct.

11. The method of claim 10, wherein a majority of a longitudinal central portion of the cable is housed within the compliant sealing gasket.

12. The method of claim 10, wherein the clamp abridges a gap between a first end and a second end of the compliant sealing gasket.

13. The method of claim 10, wherein the compliant sealing gasket houses two parallel lengths of cable, each cable resting within an opposing edge region of the compliant sealing gasket that has an increased thickness as compared to a central region of the compliant sealing gasket.

14. The method of claim 13, wherein the central region forms the seat of the compliant sealing gasket that receives the annular component when the tightening mechanism of the clamp is engaged.

15. The method of claim 10, wherein the clamp includes a base portion that attaches the first end portion of the cable and the tensioning mechanism of the clamp attaches to the second end portion of the cable.

16. The method of claim 10, wherein the tightening mechanism of the clamp pulls the first end portion of the cable toward the second end portion of the cable.

17. The method of claim 10, wherein the first and second ducts are formed of a flexible material.

18. A duct coupling system comprising:
    a compliant sealing gasket forming an inwardly-facing seat, the compliant sealing gasket attached to a perimeter of a first duct and to apply an inward force on a perimeter of a second duct, the compliant sealing gasket arranged in an annular shape;
    two parallel lengths of cable adjacent a first surface of the compliant sealing gasket, each of the two parallel lengths of cable including a longitudinal central portion that encircles the annular shape and extends between a first end portion and a second end portion; and
    a clamp attached to the first end portion and to the second end portion of each of the two parallel lengths of cable, the clamp including a tightening mechanism engagable to tension the parallel lengths of cable and thereby circumferentially compress the compliant sealing gasket radially inward toward a center of the annular shape.

19. The duct coupling system of claim 18, further comprising:
    an annular component attached to a perimeter of the second duct, the annular component sized to interface with the seat of the compliant sealing gasket formed between the outer portions of increased thickness when the tightening mechanism of the clamp is engaged, thereby forming a seal between the first duct and the second duct.

20. The duct coupling system of claim 18, wherein the compliant sealing gasket includes outer portions of increased thickness and the longitudinal central portion of each one of the two parallel lengths of cable is threaded through a channel formed in a corresponding one of the outer portions.

* * * * *